US011627700B2

(12) United States Patent
Schnaider et al.

(10) Patent No.: US 11,627,700 B2
(45) Date of Patent: Apr. 18, 2023

(54) HEADER STABILIZATION CONTROL SYSTEM FOR A COMBINE HARVESTER

(71) Applicant: Topcon Positioning Systems, Inc., Livermore, CA (US)

(72) Inventors: James Schnaider, Martensville (CA); Matthew Petryshyn, Hague (CA)

(73) Assignee: Topcon Positioning Systems, Inc., Livermore, CA (US)

( * ) Notice: Subject to any disclaimer, the term of this patent is extended or adjusted under 35 U.S.C. 154(b) by 355 days.

(21) Appl. No.: 16/856,718

(22) Filed: Apr. 23, 2020

(65) Prior Publication Data

US 2021/0329837 A1   Oct. 28, 2021

(51) Int. Cl.
*A01D 41/14*   (2006.01)

(52) U.S. Cl.
CPC ......... *A01D 41/141* (2013.01); *A01D 41/145* (2013.01)

(58) Field of Classification Search
CPC .... A01D 34/28; A01D 34/283; A01D 34/286; A01D 34/24; A01D 34/243; A01D 34/246; A01D 41/141; A01D 41/145
See application file for complete search history.

(56) References Cited

U.S. PATENT DOCUMENTS

| | | | | |
|---|---|---|---|---|
| 6,834,223 B2 * | 12/2004 | Strelioff | ............. | A01M 7/0057 701/50 |
| 8,720,170 B2 * | 5/2014 | Deneault | ............. | A01D 41/141 701/50 |
| 9,693,502 B2 * | 7/2017 | Gofron | ............... | A01D 41/141 |
| 9,763,437 B2 | 9/2017 | Schnaider et al. | | |
| 9,832,925 B2 | 12/2017 | Leeb | | |

(Continued)

FOREIGN PATENT DOCUMENTS

| | | | | |
|---|---|---|---|---|
| CA | 3052313 A1 * | 4/2020 | .......... | A01B 63/002 |
| EP | 1374661 A1 | 1/2004 | | |

(Continued)

OTHER PUBLICATIONS

Xie et al., "Fundamental Limits in Combine Harvester Header Height Control," Journal of Dynamic Systems, Measurement, and Control, vol. 135, No. 3, 2013, 8 pgs.

(Continued)

*Primary Examiner* — Adam J Behrens
(74) *Attorney, Agent, or Firm* — Chiesa, Shahinian & Giantomasi PC

(57) ABSTRACT

Systems and methods for stabilizing a header of a combine harvester are provided. A vertical disturbance signal indicative of a vertical disturbance on the header and a lateral tilt disturbance signal indicative of a lateral tilt disturbance on the header are received from one or more sensors disposed on the header. A compensated vertical displacement value is determined based on the vertical disturbance signal and a compensated lateral tilt displacement value is determined based on the lateral tilt disturbance signal. One or more control signals are transmitted to one or more actuators to vertically displace the header based on the compensated vertical displacement value to compensate for the vertical disturbance and to rotationally displace the header about a pivot joint based on the compensated lateral tilt disturbance signal to compensate for the lateral tilt disturbance.

32 Claims, 6 Drawing Sheets

(56) References Cited

U.S. PATENT DOCUMENTS

| | | | |
|---|---|---|---|
| 2004/0006958 A1* | 1/2004 | Thiemann | A01D 41/141 56/10.2 R |
| 2010/0000191 A1* | 1/2010 | Ehrhart | A01D 34/283 56/10.2 E |
| 2011/0283673 A1 | 11/2011 | Moersch et al. | |
| 2016/0270290 A1* | 9/2016 | Johnson | A01D 75/287 |
| 2016/0330948 A1* | 11/2016 | Schnaider | A01M 7/0085 |
| 2020/0053961 A1* | 2/2020 | Dix | A01D 45/021 |
| 2020/0077584 A1* | 3/2020 | Miller | A01D 41/141 |
| 2020/0077585 A1* | 3/2020 | Garbald | A01D 41/145 |
| 2021/0289703 A1* | 9/2021 | Hunt | A01D 41/141 |

FOREIGN PATENT DOCUMENTS

| | | | |
|---|---|---|---|
| EP | 2387870 A1 | 11/2011 | |
| EP | 2832206 A1 | 2/2015 | |
| EP | 3092897 A1 | 11/2016 | |
| EP | 3420798 A1 | 1/2019 | |
| WO | WO-2020185873 A1 * | 9/2020 | A01B 63/111 |

OTHER PUBLICATIONS

International Search Report and Written Opinion dated May 3, 2021, in connection with International U.S. Appl. No. 16/856,718, filed Jan. 27, 2021, 13 pgs.

* cited by examiner

300

302
Receive, from One or More Sensors Disposed on a Header of a Combine Harvester, a Vertical Disturbance Signal Indicative of a Vertical Disturbance on the Header and a Lateral Tilt Disturbance Signal Indicative of a Lateral Tilt Disturbance on the Header

304
Determine a Compensated Vertical Displacement Value Based on the Vertical Disturbance Signal

306
Determine a Compensated Lateral Tilt Displacement Value Based on the Lateral Tilt Disturbance Signal

308
Transmit One or More Control Signals to One or More Actuators to Vertically Displace the Header Based on the Compensated Vertical Displacement Value to Compensate for the Vertical Disturbance and to Rotationally Displace the Header about a Pivot Joint Based on the Compensated Lateral Tilt Displacement Value to Compensate for the Lateral Tilt Disturbance

HEADER STABILIZATION CONTROL SYSTEM FOR A COMBINE HARVESTER

TECHNICAL FIELD

The present invention relates generally to a header stabilization control system for a combine harvester, and more particularly to a header stabilization control system for compensating for vertical and lateral disturbances to a header of a combine harvester using an inertial measurement unit disposed on the header.

BACKGROUND

Combine harvesters are typically used in agriculture for harvesting crops in agricultural fields. A header is typically mounted at the front of the combine harvester for cutting crops. As the combine harvester harvests crops over the agricultural field, it is important that the header maintain a particular header height above the ground surface. A header height that is too high may result in a reduction in harvest yield while a header height that is too low may result in damage to the header. Maintaining such a particular header height is challenging due to the unevenness of the ground of the agricultural field.

Conventional header height control systems automatically raise and lower the header as the combine harvester travels through an agricultural field based on height sensors that measure the distance from the header to the ground. However, most conventional header height control systems do not consider any other input, such as the measurement of disturbances from the carrier vehicle or the effect of header position based on tire deflection or other sources of header suspension. Similarly, conventional header height control systems do not account for lateral tilt disturbances to the header.

SUMMARY

In accordance with one or more embodiments, systems and methods for stabilizing a header of a combine harvester are provided. A vertical disturbance signal indicative of a vertical disturbance on the header and a lateral tilt disturbance signal indicative of a lateral tilt disturbance on the header are received from one or more sensors disposed on the header. A compensated vertical displacement value is determined based on the vertical disturbance signal and a compensated lateral tilt displacement value is determined based on the lateral tilt disturbance signal. One or more control signals are transmitted to one or more actuators to vertically displace the header based on the compensated vertical displacement value to compensate for the vertical disturbance and to rotationally displace the header about a pivot joint based on the compensated lateral tilt disturbance value to compensate for the lateral tilt disturbance.

In one embodiment, the vertical disturbance signal represents a vertical acceleration of the header and the lateral tilt disturbance signal represents an angular velocity of the header in a rotational direction about the pivot joint.

In one embodiment, a first control signal is transmitted to instruct a first set of actuators to vertically displace the header based on the compensated vertical displacement value and a second control signal is transmitted to instruct a second set of actuators to rotationally displace the header based on the compensated lateral tilt displacement value.

In one embodiment, the compensated vertical displacement value is determined by calculating a vertical position of the header based on an acceleration of the header determined from the vertical disturbance signal, determining a vertical height error of the header, and determining the compensated vertical displacement value based on the vertical position and the vertical height error. For example, the compensated vertical displacement value may be determined by adding the vertical position and the vertical height error.

In one embodiment, the compensated lateral tilt displacement value is determined by calculating a lateral tilt position of the header based on an angular velocity of the header determined from the lateral tilt disturbance signal, determining a lateral tilt error of the header, and determining the compensated lateral tilt displacement value based on the lateral tilt position and the lateral tilt error. For example, the compensated lateral tilt displacement value may be determined by adding the lateral tilt position and the lateral tilt error.

In one embodiment, the one or more sensors is an inertial measurement unit.

These and other advantages of the invention will be apparent to those of ordinary skill in the art by reference to the following detailed description and the accompanying drawings.

BRIEF DESCRIPTION OF THE DRAWINGS

FIG. 3 shows a method for stabilizing a header of a combine harvester;

DETAILED DESCRIPTION

Figure 1:
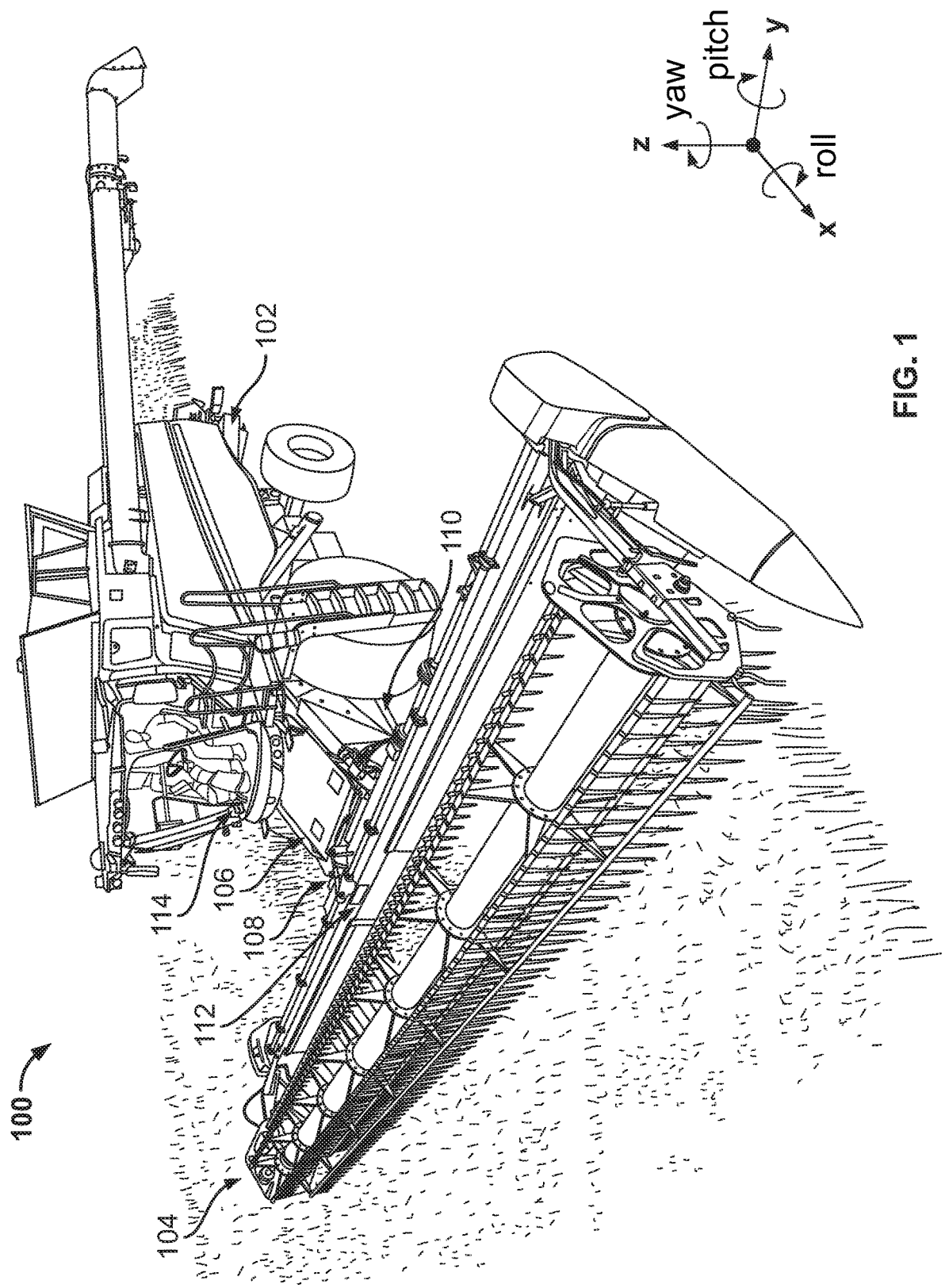
FIG. 1 shows an illustrative combine harvester.

Referring to FIG. 1, an exemplary combine harvester 100 is shown, in accordance with one or more embodiments. Combine harvester 100 includes a self-propelled vehicle 102 and a header 104 mounted at a front end of vehicle 102 via feederhouse 106. Header 104 is pivotably coupled to vehicle 102 by pivot joint 108 (via feederhouse 106). Generally, in operation, as combine harvester 100 travels over an agricultural field, header 104 cuts crops for harvesting. The cut crops are carried up feederhouse 106 for continued processing.

Conventionally, it is difficult to maintain a particular header height due to, e.g., unevenness of the ground of the agricultural field or turning of the combine harvester. The header height refers to the distance between a point on the header (e.g., the tip of the header) and the ground. A header height that is too high may result in a reduction in harvest yield while a header height that is too low may result in damage to the header.

Advantageously, embodiments of the present invention provide for a header stabilization control system for compensating for both vertical disturbances and lateral tilt disturbances on header 104. One or more sensors 112 are disposed on header 104 and are configured to provide an output comprising a vertical disturbance signal indicative of a vertical disturbance on header 104 and a lateral tilt disturbance signal indicative of a lateral tilt disturbance on header 104. An electronic control unit (ECU) 114 sends control signals to one or more actuators 110 to displace header 104 to compensate for the vertical and lateral tilt disturbances.

It should be understood that while embodiments discussed herein may be discussed with respect to stabilizing a header of a combine harvester, the present invention is not so limited. Embodiments of the present invention may be applied for stabilizing any type of boom on any type of vehicle. For example, embodiments of the present invention may be applied for stabilizing a boom of a sprayer.

Figure 2:
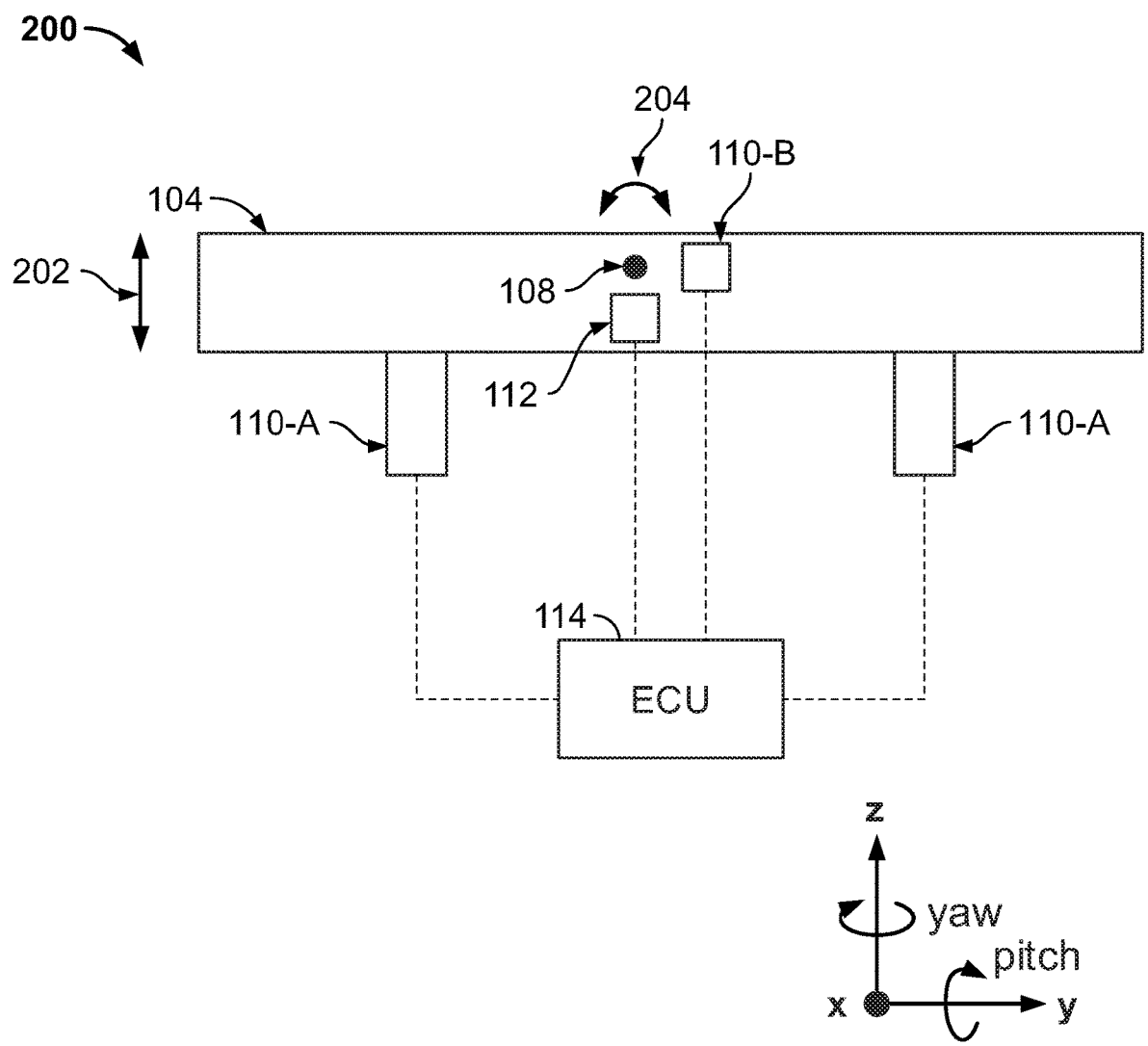
FIG. 2 shows a high-level schematic diagram of a header stabilization control system.

FIG. 2 shows a high-level schematic diagram of a header stabilization control system 200, in accordance with one or more embodiments. FIG. 2 will be described with reference to FIG. 1. Header stabilization control system 200 comprises ECU 114 communicatively coupled to one or more sensors 112 located on header 104 and first and second set of actuators 110-A and 110-B (collectively referred to as actuators 110). ECU 114, sensors 112, and actuators 110 may be communicatively coupled in any suitable manner (e.g., wired via a cable or wireless). Header stabilization control system 200 is schematically shown in FIG. 2 with respect to a front view of header 104.

Sensors 112 are disposed or mounted on header 104 and configured to detect vertical disturbances on header 104 and lateral tilt disturbances on header 104. The vertical disturbances on header 104 refer to disturbances that vertically displace a header 104 in a vertical direction 202 (i.e., up or down in the z direction). The lateral tilt disturbances on header 104 refer to disturbances that rotationally displace the lateral tilt of header 104 in a rotational direction 204 (e.g., clockwise or counterclockwise) about pivot joint 108 (i.e., about roll axis x, which is not explicitly shown in FIG. 2 but is perpendicular to both the y and z axes). Such vertical and lateral tilt disturbances on header 104 represent the activity of elements of combine harvester 100 supporting header 104, such as, e.g., tire flex of the tires of combine harvester 100, hydraulic compliance of the header raise circuit or intentional hydraulic suspension (hydraulic accumulators), mechanical flex of combine harvester 100, combine adapter (the mechanical suspension between combine harvester 100 and header 104), or any other disturbance that affects the vertical displacement or the lateral tilt displacement of header 104. Such disturbances may occur when, e.g., combine harvester 100 travels over uneven ground (e.g., a bump on the ground) or when combine harvester 100 changes directions.

Sensors 112 may be any suitable sensor for detecting or quantifying vertical and lateral tilt disturbances to header 104, such as, e.g., an accelerometer, a gyroscope, or any other type of sensor or combination of sensors. Sensors 112 may include any number of sensors disposed on header 104 at any suitable location along the length of header 104. In one embodiment, as shown in FIG. 2, sensors 112 comprise a single sensor positioned at or near a center of header 104. In another embodiment, sensors 112 comprise two sensors positioned at each end of header 104. In some embodiments, sensors 112 may be integrated into ECU 114 and mounted on header 104. Sensors 112 are configured to output a vertical disturbance signal indicative of a vertical disturbance on header 104 and a lateral tilt disturbance signal indicative of a lateral tilt disturbance on header 104.

In one embodiment, sensor 112 is an inertial measurement unit (IMU). The IMU comprises an accelerometer and a gyroscope (and possibly a magnetometer). The accelerometer of the IMU quantifies vertical disturbances in the form of acceleration while the gyroscope of the IMU quantifies lateral tilt disturbances in the form of angular velocity. Accordingly, the IMU outputs a vertical disturbance signal that represents acceleration of header 104 in a vertical direction 202 and is indicative of vertical disturbances on header 104, and a lateral tilt disturbance signal that represents angular velocity of header 104 in a rotational direction 204 and is indicative lateral tilt disturbances on header 104.

In one embodiment, sensors 112 comprise a discrete accelerometer that outputs the vertical disturbance signal and a discrete gyroscope that outputs the lateral tilt disturbance signal. In one embodiment, sensors 112 comprise two accelerometers positioned at each end of header 104 and the lateral tilt disturbance signal is determined based on the difference between the angular accelerations from the two accelerometers. In one embodiment, sensors 112 comprise an angular acceleration sensor that outputs the lateral tilt disturbance single that represents an angular acceleration of header 104 in rotation direction 204.

ECU 114 receives the vertical disturbance signal and the lateral tilt disturbance signal from sensors 112. ECU 114 may be implemented using any suitable computing device, such as, e.g., computer 602 of FIG. 6. ECU 114 may be located at any suitable location on combine harvester 100 (e.g., in a cabin of combine harvester 100 or on header 104), or may be located remotely from combine harvester 100 communicating wirelessly with sensors 112 and actuators 110. ECU 114 determines a compensated vertical displacement value based on the vertical disturbance signal and a compensated lateral tilt displacement value based on the lateral tilt disturbance signal, and transmits one or more control signals to one or more actuators 110 to vertically displace header 104 based on the compensated vertical displacement value to compensate for the vertical disturbances and to rotationally displace header 104 based on the compensated lateral tilt displacement value to compensate for the lateral tilt disturbances. In one embodiment, ECU 114 performs the steps of method 300 of FIG. 3, described in detail below.

Actuators 110 may include any suitable number of actuators positioned at any suitable location to vertically displace header 104 and rotationally displace header 104. In one embodiment, as shown in FIG. 2, actuators 110 comprise a first set of one or more actuators 110-A for vertically displacing header 104 in vertical direction 202 and a second set of one or more actuators 110-B for rotationally displacing header 104 in rotational direction 204. First set of actuators 110-A and second set of actuators 110-B may be coupled between a chassis of vehicle 102 and feederhouse 106 (which supports header 104). In one example, first set of actuators 110-A may be located on one or both sides of feederhouse 106 and second set of actuators 110-B may be located relatively closer to pivot joint 108. Actuators 110 extend and retract to displace header 104. For example, first set of actuators 110-A may each extend or each retract to vertically displace header 104 to compensate for vertical disturbances. Additionally or alternatively, second set of actuators 110-B may extend and/or retract to rotationally displace header 104 in rotational direction 204 to compensate for lateral tilt disturbances. For example, as shown in FIG. 2, where second set of actuators 110-B comprise a single actuator, the actuator may extend or retract to rotationally displace header 104 in a counterclockwise rotational direction 204 or a clockwise rotational direction 204, respectively. In another example, where second set of actuators 110-B comprises a first actuator and a second actuator located on opposites sides of pivot joint 108, the first actuator may extend (or retract) and the second actuator may retract (or extend) to rotationally displace header 104 in a rotational direction 204. Actuators 110 may be any suitable device for controlling movement of header 104. For example, actuators 110 may be based on electrical current, hydraulic fluid pressure, pneumatic pressure, etc. Exemplary actuators 110 include linear hydraulic cylinders and linear electric motors.

FIG. 3 shows a method 300 for stabilizing a header of a combine harvester, in accordance with one or more embodiments. FIG. 3 will be described with reference to FIGS. 1 and 2. Method 300 may be performed by any suitable computing device, such as, e.g., computer 602 of FIG. 6. In one embodiment, method 300 is performed by ECU 114 of FIGS. 1 and 2.

At step 302, a vertical disturbance signal indicative of a vertical disturbance on header 104 and a lateral tilt disturbance signal indicative of a lateral tilt disturbance on header 104 are received from one or more sensors 112 disposed on header 104 of a combine harvester 100. In one embodiment, the vertical disturbance signal represents vertical acceleration of header 104 in a vertical direction 202 and the lateral tilt disturbance signal represents angular velocity of header 104 in a rotational direction 204. In one embodiment, the vertical disturbance signal and the lateral tilt disturbance signal are in the form of voltage proportional to acceleration and angular velocity, respectively.

At step 304, a compensated vertical displacement value is determined based on the vertical disturbance signal. In one embodiment, the compensated vertical displacement value may be determined according to method 400 of FIG. 4.

At step 306, a compensated lateral tilt displacement value is determined based on the lateral tilt disturbance signal. In one embodiment, the compensated lateral tilt displacement value may be determined according to method 500 of FIG. 5.

At step 308, one or more control signals are transmitted to one or more actuators 110 to vertically displace header 104 based on the compensated vertical displacement value to compensate for the vertical disturbance and/or to rotationally displace header 104 about a pivot joint based on the compensated lateral tilt displacement value to compensate for the lateral tilt disturbance on header 104. In one embodiment, a first control signal is transmitted to a first set of actuators 110-A to vertically displace header 104 and a second control signal is transmitted to a second set of actuators 110-B to rotationally displace header 104.

Figure 4:
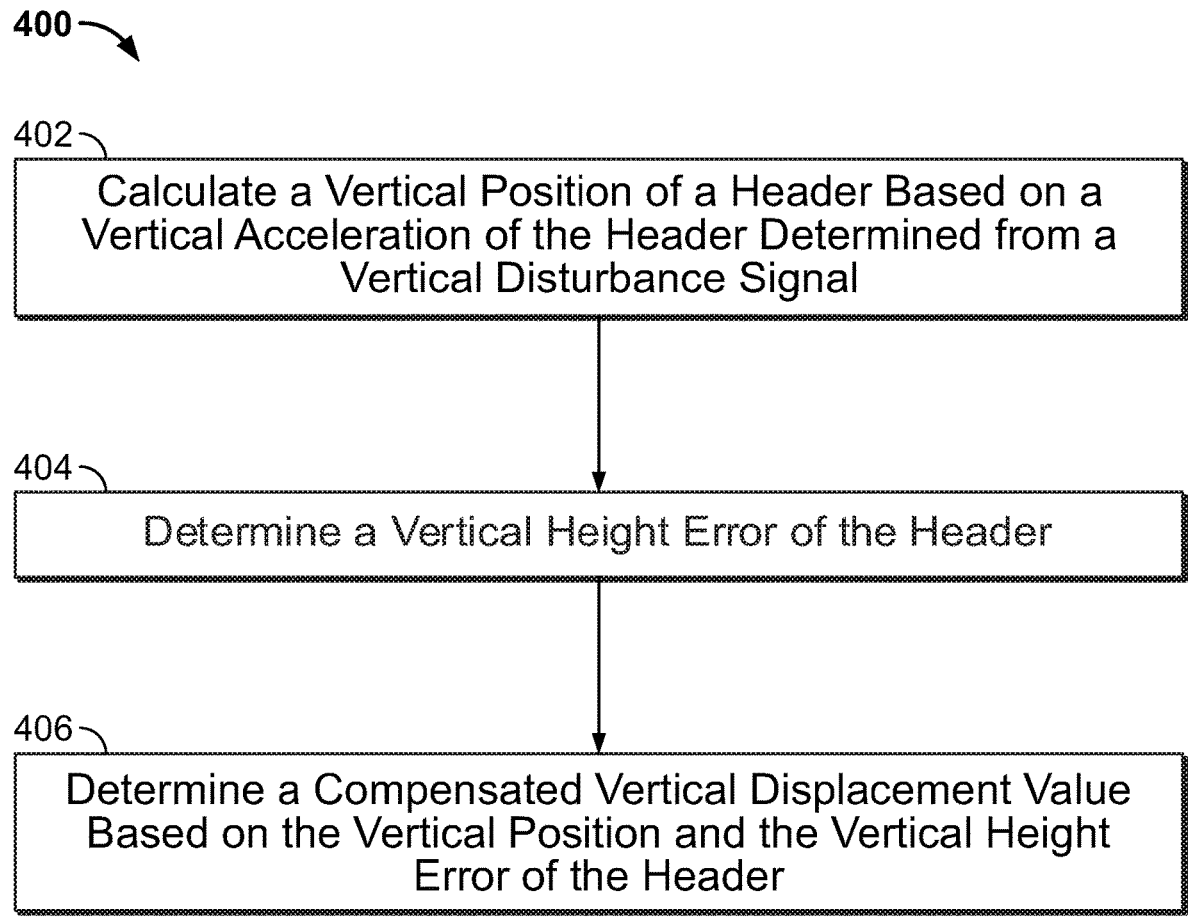
FIG. 4 shows a method for determining a compensated vertical displacement value.

FIG. 4 shows a method 400 for determining a compensated vertical displacement value, in accordance with one or more embodiments. FIG. 4 will be described with reference to FIGS. 1 and 2. Method 400 may be performed by any suitable computing device, such as, e.g., computer 602 of FIG. 6. In one embodiment, method 400 is performed by ECU 114 of FIGS. 1 and 2 for performing step 304 of FIG. 3.

At step 402, a vertical position of header 104 is calculated based on a vertical acceleration of header 104 determined from the vertical disturbance signal. The vertical disturbance signal represents vertical acceleration of header 104 and is indicative of a vertical disturbance on header 104. The vertical acceleration of header 104 is preferably a linear acceleration of header 104, however it is possible that the vertical acceleration of header 104 may be an angular acceleration. The vertical position of header 104 is a relative position (distance) relative to an inertial frame of reference.

The vertical position of header 104 is estimated from the vertical acceleration of header 104 by manipulating the dynamic response of the vertical acceleration to match that of the mechanical system and then scaling the result. The resulting signal closely estimates the effect of vertical position changes as a result of vertical disturbances from the carrier vehicle (e.g., combine harvester) or motion caused by the supporting suspension.

At step 404, a vertical height error of the header is determined. The vertical height error of the header represents the header height of header 104 above the ground surface. The header height of header 104 may be determined using one or more distance sensors (not shown in the Figures), such as, e.g., ultrasonic transducers, positioned on header 104. The vertical height error may be calculated as the average header heights measured by the distance sensors.

At step 406, a compensated vertical displacement value is determined based on the vertical position and the vertical height error of header 104. In one embodiment, the compensated vertical displacement value is calculated by adding the vertical position and the vertical height error. Since the vertical position is relative to an inertial frame of reference while the vertical height error is an absolute position above the ground surface, the compensated vertical displacement value is calculated by adding the vertical position and the vertical height error while taking into account the known inertial frame of reference.

Figure 5:
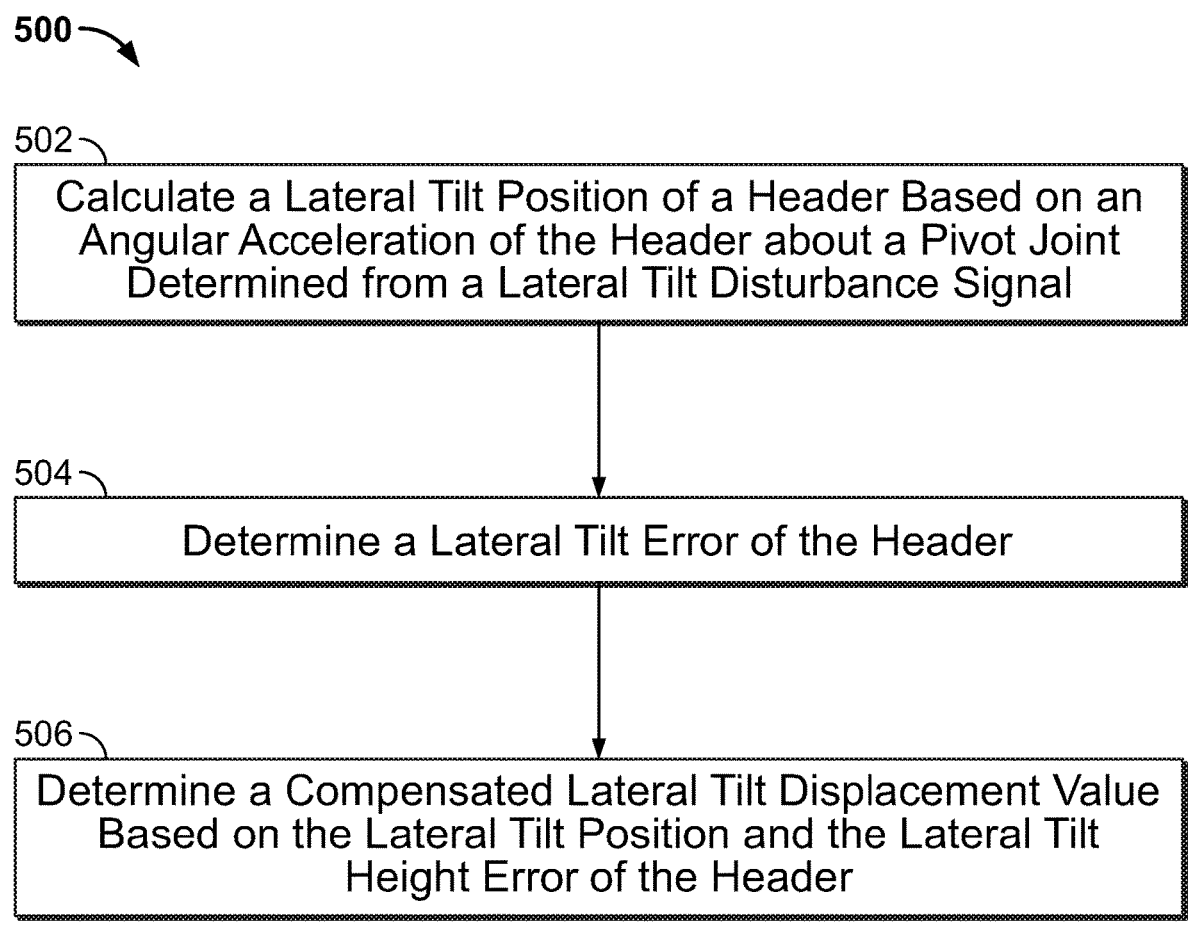
FIG. 5 shows a method for determining a compensated lateral tilt displacement value.

FIG. 5 shows a method 500 for determining a compensated lateral tilt displacement value, in accordance with one or more embodiments. FIG. 5 will be described with reference to FIGS. 1 and 2. Method 500 may be performed by any suitable computing device, such as, e.g., computer 602 of FIG. 6. In one embodiment, method 500 is performed by ECU 114 of FIGS. 1 and 2 for performing step 306 of FIG. 3.

At step 502, a lateral tilt position of header 104 is calculated based on an angular acceleration of header 104 about a pivot joint determined from the lateral tilt disturbance signal. The lateral tilt disturbance signal represents angular velocity of header 104 about the pivot joint and is indicative of a lateral tilt disturbance to header 104. The angular acceleration on header 104 may be calculated as the derivative of the angular velocity of header 104.

The lateral tilt position of header 104 is estimated from the angular acceleration of header 104 by manipulating the dynamic response of the signal to match that of the mechanical system and then scaling the result. The resulting signal closely estimates the effect of lateral tilt position changes as a result of lateral tilt disturbances from the carrier vehicle (e.g., combine harvester) or motion caused by supporting suspension.

At step 504, a lateral tilt error of the header is determined. The lateral tilt error is calculated as the differential header height determined at each end of header 104. The header height at each end of header 104 may be determined using distance sensors (not shown in the Figures), such as, e.g., ultrasonic transducers, positioned at each end of header 104. The lateral tilt error may be calculated as the difference between the header height at a left end of header 104 and the header height at a right end of header 104, where the lateral tilt error is zero when the header height at the left end and the right end are equal. In one embodiment, the lateral tilt error of header 104 is calculated as described in U.S. Pat. No. 6,834,223, entitled "Roll Control System and Method for a Suspended Boom," the disclosure of which is incorporated herein by reference in its entirety.

At step 506, a compensated lateral tilt displacement value is determined based on the lateral tilt position and the lateral tilt error of header 104. In one embodiment, the compensated lateral tilt displacement value is calculated by adding the lateral tilt position and the lateral tilt error. Since the lateral tilt position is based on distance to ground surface and the lateral tilt error is relative to an inertial frame of reference, the compensated lateral tilt displacement value is calculated by adding the lateral tilt position and the lateral tilt error while taking into account the known inertial frame(s) of reference.

It should be understood that additional signal processing steps may be applied to method 400 of FIG. 4 and method 500 of FIG. 5. For example, a deadband removal step may be performed in methods 400 and 500 by comparing the compensated vertical displacement value and the compensated lateral tilt displacement value with a deadband threshold value so that no adjustment is made to the vertical displacement and the lateral tilt displacement of header 104 if the deadband threshold value is not satisfied. In another example, a filtering step may be performed in methods 400 and 500 to filter the signals to reduce noise. For instance, a high-pass or band pass filter may be applied to the signals from the one or more sensors as the signals that are of interest are above a certain frequency or rate. In another example, in method 500, the conversion of velocity to acceleration may involve calculating a derivative of the angular velocity to determine the angular acceleration and applying additional signal processing steps, such as, e.g., shifting phase to match header dynamics, scaling, polarizing, etc. Additional signal processing steps may also be applied.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 3-5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
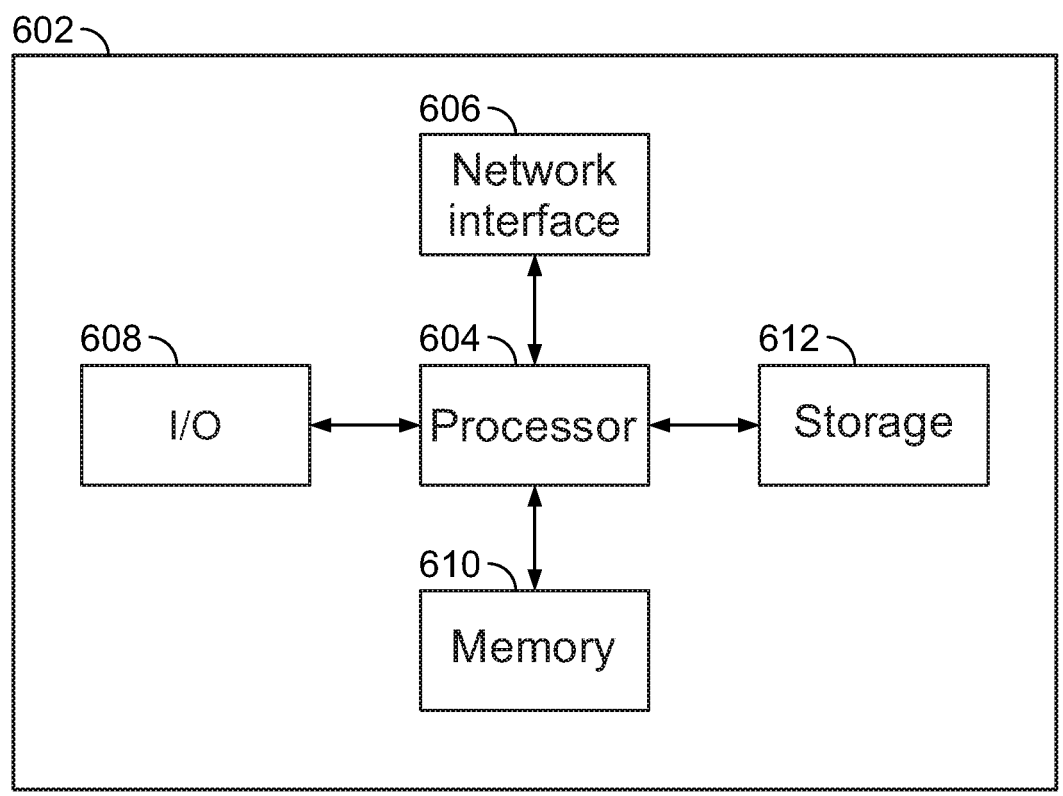
FIG. 6 shows a high-level block diagram of a computer.

A high-level block diagram of an example computer 602 that may be used to implement systems, apparatus, and methods described herein is depicted in FIG. 6. Any or all of the systems and apparatus discussed herein, including ECU 114 of FIGS. 1 and 2, may be implemented using one or more computers such as computer 602. Computer 602 includes a processor 604 operatively coupled to a data storage device 612 and a memory 610. Processor 604 controls the overall operation of computer 602 by executing computer program instructions that define such operations. The computer program instructions may be stored in data storage device 612, or other computer readable medium, and loaded into memory 610 when execution of the computer program instructions is desired. Thus, the method and workflow steps or functions of FIGS. 3-5 can be defined by the computer program instructions stored in memory 610 and/or data storage device 612 and controlled by processor 604 executing the computer program instructions. For example, the computer program instructions can be implemented as computer executable code programmed by one skilled in the art to perform the method and workflow steps or functions of FIGS. 3-5. Accordingly, by executing the computer program instructions, the processor 604 executes the method and workflow steps or functions of FIGS. 3-5. Computer 604 may also include one or more network interfaces 606 for communicating with other devices via a network. Computer 602 may also include one or more input/output devices 608 that enable user interaction with computer 602 (e.g., display, keyboard, mouse, speakers, buttons, etc.).

Processor 604 may include both general and special purpose microprocessors, and may be the sole processor or one of multiple processors of computer 602. Processor 604 may include one or more central processing units (CPUs), for example. Processor 604, data storage device 612, and/or memory 610 may include, be supplemented by, or incorporated in, one or more application-specific integrated circuits (ASICs) and/or one or more field programmable gate arrays (FPGAs).

Data storage device 612 and memory 610 each include a tangible non-transitory computer readable storage medium. Data storage device 612, and memory 610, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 608 may include peripherals, such as a printer, scanner, display screen, etc. For example, input/output devices 608 may include a display device such as a cathode ray tube (CRT) or liquid crystal display (LCD) monitor for displaying information to the user, a keyboard, and a pointing device such as a mouse or a trackball by which the user can provide input to computer 602.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
   receiving, from one or more sensors disposed on a header of a combine harvester, a vertical disturbance signal indicative of a vertical disturbance on the header and a lateral tilt disturbance signal indicative of a lateral tilt disturbance on the header;
   determining a compensated vertical displacement value based on the vertical disturbance signal by:
      calculating a vertical position of the header based on a vertical acceleration of the header determined from the vertical disturbance signal;
      determining a vertical height error of the header; and
      determining the compensated vertical displacement value based on the vertical position and the vertical height error;
   determining a compensated lateral tilt displacement value based on the lateral tilt disturbance signal; and
   transmitting one or more control signals to two or more actuators to vertically displace the header based on the compensated vertical displacement value to compensate for the vertical disturbance and to rotationally displace the header about a pivot joint based on the compensated lateral tilt displacement value to compensate for the lateral tilt disturbance.

2. The method of claim 1, wherein the vertical disturbance signal represents a vertical acceleration of the header.

3. The method of claim 1, wherein the lateral tilt disturbance signal represents an angular velocity of the header in a rotational direction about the pivot joint.

4. The method of claim 1, wherein transmitting one or more control signals to one or more actuators to vertically displace the header based on the compensated vertical displacement value to compensate for the vertical disturbance and to rotationally displace the header about a pivot joint based on the compensated lateral tilt displacement value to compensate for the lateral tilt disturbance comprises:
   transmitting a first control signal to instruct a first set of actuators of the two or more actuators to vertically displace the header based on the compensated vertical displacement value; and
   transmitting a second control signal to instruct a second set of actuators of the two or more actuators to rotationally displace the header based on the compensated lateral tilt displacement value.

5. The method of claim 1, wherein determining the compensated vertical displacement value based on the vertical position and the vertical height error comprises:
   determining the compensated vertical displacement value by adding the vertical position and the vertical height error.

6. The method of claim 1, wherein determining a compensated lateral tilt displacement value based on the lateral tilt disturbance signal comprises:
   calculating a lateral tilt position of the header based on an angular acceleration of the header determined from the lateral tilt disturbance signal;
   determining a lateral tilt error of the header; and
   determining the compensated lateral tilt displacement value based on the lateral tilt position and the lateral tilt error.

7. The method of claim 6, wherein determining the compensated lateral tilt displacement value based on the lateral tilt position and the lateral tilt error comprises:
   determining the compensated lateral tilt displacement value by adding the lateral tilt position and the lateral tilt error.

8. The method of claim 1, wherein the one or more sensors comprises an inertial measurement unit.

9. A non-transitory computer readable medium storing computer program instructions, the computer program instructions when executed by a processor cause the processor to perform operations comprising:
   receiving, from one or more sensors disposed on a header of a combine harvester, a vertical disturbance signal indicative of a vertical disturbance on the header and a lateral tilt disturbance signal indicative of a lateral tilt disturbance on the header;
   determining a compensated vertical displacement value based on the vertical disturbance signal by:
      calculating a vertical position of the header based on a vertical acceleration of the header determined from the vertical disturbance signal;
      determining a vertical height error of the header; and
      determining the compensated vertical displacement value based on the vertical position and the vertical height error;
   determining a compensated lateral tilt displacement value based on the lateral tilt disturbance signal; and
   transmitting one or more control signals to two or more actuators to vertically displace the header based on the compensated vertical displacement value to compensate for the vertical disturbance and to rotationally displace the header about a pivot joint based on the compensated lateral tilt displacement value to compensate for the lateral tilt disturbance.

10. The non-transitory computer readable medium of claim 9, wherein the vertical disturbance signal represents a vertical acceleration of the header.

11. The non-transitory computer readable medium of claim 9, wherein the lateral tilt disturbance signal represents an angular velocity of the header in a rotational direction about the pivot joint.

12. The non-transitory computer readable medium of claim 9, wherein transmitting one or more control signals to one or more actuators to vertically displace the header based on the compensated vertical displacement value to compensate for the vertical disturbance and to rotationally displace the header about a pivot joint based on the compensated lateral tilt displacement value to compensate for the lateral tilt disturbance comprises:
   transmitting a first control signal to instruct a first set of actuators of the two or more actuators to vertically displace the header based on the compensated vertical displacement value; and
   transmitting a second control signal to instruct a second set of actuators of the two or more actuators to rotationally displace the header based on the compensated lateral tilt displacement value.

13. The non-transitory computer readable medium of claim 9, wherein determining a compensated lateral tilt displacement value based on the lateral tilt disturbance signal comprises:
   calculating a lateral tilt position of the header based on an angular acceleration of the header determined from the lateral tilt disturbance signal;
   determining a lateral tilt error of the header; and determining the compensated lateral tilt displacement value based on the lateral tilt position and the lateral tilt error.

14. A system comprising:
one or more sensors disposed on a header of a combine harvester;
two or more actuators; and
an electronic control unit for:
- receiving, from the one or more sensors, a vertical disturbance signal indicative of a vertical disturbance on the header and a lateral tilt disturbance signal indicative of a lateral tilt disturbance on the header;
- determining a compensated vertical displacement value based on the vertical disturbance signal by:
  - calculating a vertical position of the header based on a vertical acceleration of the header determined from the vertical disturbance signal;
  - determining a vertical height error of the header; and
  - determining the compensated vertical displacement value based on the vertical position and the vertical height error;
- determining a compensated lateral tilt displacement value based on the lateral tilt disturbance signal; and
- transmitting one or more control signals to the two or more actuators to vertically displace the header based on the compensated vertical displacement value to compensate for the vertical disturbance and to rotationally displace the header about a pivot joint based on the compensated lateral tilt displacement value to compensate for the lateral tilt disturbance.

15. The system of claim 14, wherein the vertical disturbance signal represents a vertical acceleration of the header.

16. The system of claim 14, wherein the lateral tilt disturbance signal represents an angular velocity of the header in a rotational direction about the pivot joint.

17. The system of claim 14, wherein the two or more actuators comprises a first set of actuators and a second set of actuators, and transmitting one or more control signals to the one or more actuators to vertically displace the header based on the compensated vertical displacement value to compensate for the vertical disturbance and to rotationally displace the header about a pivot joint based on the compensated lateral tilt displacement value to compensate for the lateral tilt disturbance comprises:
- transmitting a first control signal to instruct the first set of actuators to vertically displace the header based on the compensated vertical displacement value; and
- transmitting a second control signal to instruct the second set of actuators to rotationally displace the header based on the compensated lateral tilt displacement value.

18. The system of claim 14, wherein determining a compensated lateral tilt displacement value based on the lateral tilt disturbance signal comprises:
- calculating a lateral tilt position of the header based on an angular acceleration of the header determined from the lateral tilt disturbance signal;
- determining a lateral tilt error of the header; and
- determining the compensated lateral tilt displacement value based on the lateral tilt position and the lateral tilt error.

19. The system of claim 14, wherein the one or more sensors comprises an inertial measurement unit.

20. An agricultural machine, comprising:
a vehicle;
a header pivotably coupled to the vehicle by a pivot joint;
one or more sensors disposed on the header;
two or more actuators connecting the vehicle with the header for controlling a height and a lateral tilt of the header; and
an electronic control unit configured for:
- receiving, from the one or more sensors, a vertical disturbance signal indicative of a vertical disturbance on the header and a lateral tilt disturbance signal indicative of a lateral tilt disturbance on the header;
- determining a compensated vertical displacement value based on the vertical disturbance signal by:
  - calculating a vertical position of the header based on a vertical acceleration of the header determined from the vertical disturbance signal;
  - determining a vertical height error of the header; and
  - determining the compensated vertical displacement value based on the vertical position and the vertical height error;
- determining a compensated lateral tilt displacement value based on the lateral tilt disturbance signal; and
- transmitting one or more control signals to the two or more actuators to vertically displace the header based on the compensated vertical displacement value to compensate for the vertical disturbance and to rotationally displace the header about a pivot joint based on the compensated lateral tilt displacement value to compensate for the lateral tilt disturbance.

21. The agricultural machine of claim 20, wherein the vertical disturbance signal represents a vertical acceleration of the header.

22. The agricultural machine of claim 20, wherein the lateral tilt disturbance signal represents an angular velocity of the header in a rotational direction about the pivot joint.

23. The agricultural machine of claim 20, wherein transmitting one or more control signals to one or more actuators to vertically displace the header based on the compensated vertical displacement value to compensate for the vertical disturbance and to rotationally displace the header about a pivot joint based on the compensated lateral tilt displacement value to compensate for the lateral tilt disturbance comprises:
- transmitting a first control signal to instruct a first set of actuators of the two or more actuators to vertically displace the header based on the compensated vertical displacement value; and
- transmitting a second control signal to instruct a second set of actuators of the two or more actuators to rotationally displace the header based on the compensated lateral tilt displacement value.

24. The agricultural machine of claim 20, wherein determining the compensated vertical displacement value based on the vertical position and the vertical height error comprises:
- determining the compensated vertical displacement value by adding the vertical position and the vertical height error.

25. The agricultural machine of claim 20, wherein determining a compensated lateral tilt displacement value based on the lateral tilt disturbance signal comprises:
- calculating a lateral tilt position of the header based on an angular acceleration of the header determined from the lateral tilt disturbance signal;
- determining a lateral tilt error of the header; and
- determining the compensated lateral tilt displacement value based on the lateral tilt position and the lateral tilt error.

26. The agricultural machine of claim 25, wherein determining the compensated lateral tilt displacement value based on the lateral tilt position and the lateral tilt error comprises:
determining the compensated lateral tilt displacement value by adding the lateral tilt position and the lateral tilt error.

27. The agricultural machine of claim 20, wherein the one or more sensors comprises an inertial measurement unit.

28. The agricultural machine of claim 20, wherein the agricultural machine is a combine harvester.

29. A method comprising:
receiving, from one or more sensors disposed on a header of a combine harvester, a vertical disturbance signal indicative of a vertical disturbance on the header and a lateral tilt disturbance signal indicative of a lateral tilt disturbance on the header;
determining a compensated vertical displacement value based on the vertical disturbance signal;
determining a compensated lateral tilt displacement value based on the lateral tilt disturbance signal, wherein determining a compensated lateral tilt displacement value based on the lateral tilt disturbance signal comprises:
calculating a lateral tilt position of the header based on an angular acceleration of the header determined from the lateral tilt disturbance signal;
determining a lateral tilt error of the header; and
determining the compensated lateral tilt displacement value based on the lateral tilt position and the lateral tilt error; and
transmitting one or more control signals to two or more actuators to vertically displace the header based on the compensated vertical displacement value to compensate for the vertical disturbance and to rotationally displace the header about a pivot joint based on the compensated lateral tilt displacement value to compensate for the lateral tilt disturbance.

30. The method of claim 29, wherein the vertical disturbance signal represents a vertical acceleration of the header.

31. The method of claim 29, wherein the lateral tilt disturbance signal represents an angular velocity of the header in a rotational direction about the pivot joint.

32. The method of claim 29, wherein determining the compensated lateral tilt displacement value based on the lateral tilt position and the lateral tilt error comprises:
determining the compensated lateral tilt displacement value by adding the lateral tilt position and the lateral tilt error.

* * * * *